(12) United States Patent
Matthews

(10) Patent No.: US 8,983,224 B1
(45) Date of Patent: Mar. 17, 2015

(54) REAL-TIME RECURSIVE FILTER TO IDENTIFY WEATHER EVENTS USING TRAFFIC CCTV VIDEO

(75) Inventor: Grant Matthews, Fort Wayne, IN (US)

(73) Assignee: Exelis, Inc., McLean, VA (US)

( * ) Notice: Subject to any disclaimer, the term of this patent is extended or adjusted under 35 U.S.C. 154(b) by 296 days.

(21) Appl. No.: 13/595,313

(22) Filed: Aug. 27, 2012

(51) Int. Cl.
*G06K 9/40* (2006.01)

(52) U.S. Cl.
USPC .......................................... 382/265; 382/100

(58) Field of Classification Search
CPC .... H04N 21/454; H04N 7/18; G10L 21/0208; G06K 9/00369; G06K 9/00496
USPC .......... 382/103, 107, 264–265, 100; 340/963, 340/968–969
See application file for complete search history.

(56) References Cited

U.S. PATENT DOCUMENTS

| | | | |
|---|---|---|---|
| 5,751,289 A * | 5/1998 | Myers | 345/419 |
| 5,990,955 A * | 11/1999 | Koz | 375/240.01 |
| 7,257,237 B1 * | 8/2007 | Luck et al. | 382/103 |
| 2003/0025599 A1 * | 2/2003 | Monroe | 340/531 |
| 2004/0151356 A1 * | 8/2004 | Li et al. | 382/131 |
| 2005/0200714 A1 * | 9/2005 | Marchese | 348/211.3 |
| 2006/0187030 A1 * | 8/2006 | Przygoda, Jr. | 340/539.13 |
| 2008/0232687 A1 * | 9/2008 | Petersohn | 382/173 |
| 2011/0234807 A1 * | 9/2011 | Jones et al. | 348/159 |
| 2011/0243401 A1 * | 10/2011 | Zabair et al. | 382/128 |
| 2012/0050477 A1 * | 3/2012 | Karaoguz et al. | 348/46 |
| 2012/0146789 A1 * | 6/2012 | De Luca et al. | 340/540 |
| 2013/0223757 A1 * | 8/2013 | Hou et al. | 382/266 |

* cited by examiner

*Primary Examiner* — Jingge Wu
(74) *Attorney, Agent, or Firm* — RatnerPrestia

(57) ABSTRACT

A program is implemented on a processor for executing the following steps: receiving images of a scene comprising successive frames from a camera, each frame including an array of pixels; filtering intensities of the array of pixels in a respective frame by using a Bessel Filter to compute a constant value for the respective frame; and summing a predetermined number of respective frames from the camera to determine rapid motion in the scene. The filter includes a Bessel filter, which is an n-pole recursive digital filter, where n is a positive integer.

19 Claims, 7 Drawing Sheets

REAL-TIME RECURSIVE FILTER TO IDENTIFY WEATHER EVENTS USING TRAFFIC CCTV VIDEO

FIELD OF THE INVENTION

The present invention relates, in general, to monitoring and tracking extreme weather events. More specifically, the present invention relates to using a real-time recursive filter to identify extreme weather events in video footage obtained from closed circuit television (CCTV).

BACKGROUND OF THE INVENTION

Forecasters use a combination of science and technology to predict the state of the atmosphere for a given location. A mix of radar, satellite, forecast models and observational data are all used to assist forecasters. Historically, weather observation networks focus on atmospheric conditions and ignore the area below the horizon where people live and drive. Thus, most weather data is primarily tailored to aviation, and not ground traffic. An example of this is forecasting a tornado for a specific area. Forecasting that atmospheric conditions are favorable for this event is possible; however, confirming this event is not possible from current weather forecasting technology. Forecasters can predict specific atmospheric conditions which are consistent with a specific weather event, but unfortunately cannot verify that the event is actually taking place, or will take place. Confirmation is left to local storm-chasers, or amateur footage to confirm the event by visual means.

Current predictive techniques for weather patterns are generally performed on a national, or multi-state regional scale. This large scale weather prediction is largely insufficient for predicting the location of specific weather conditions with enough precision to ultimately assist Emergency Response Management personnel. Prior art weather monitoring stations are generally spaced 100-200 miles apart due to expense and complexity. The wide spacing and skyward focus of these monitoring stations largely prevents them from monitoring ground conditions, and provides weather data accurate enough only to predict general weather patterns.

In order to mitigate the inability to verify local weather events, the industry has begun developing observation systems focusing on surface/ground observation. Some of these systems are able to view weather conditions using a CCTV camera system. The National Mesonet Program Alliance is one program developed specifically for ground-based observations. Another example of emerging ground-based detection systems is lightning detection, which enables real-time verification of lightning strikes.

State and local governments operate ground-based observation systems which include CCTV capabilities using weather information for winter road maintenance and traffic control. Local transportation departments usually collect road and weather data from two or more sources, such as the National Weather Service (NWS) and Road Weather Information Systems (RWIS), and fuse these data to generate information for winter road maintenance. Traffic CCTV cameras are used primarily for traffic control, although some are used to assess weather conditions.

Mesonet systems offer a significant advance in small-scale weather data. These systems, however, do not provide a coordinated visual observation capability for tracking weather events. Much of the weather data focuses on air temperature, dew point, wind speed, and data which may be augmented to atmospheric data.

Very few of any of the above mentioned systems have the ability to archive visual observations which could be used for forensics and research forecasting efforts.

Finally, the above approaches fail to exploit an inherent benefit of visually being able to observe an event in real-time, which is a critical aspect of providing validation to atmospheric models and forecasts.

SUMMARY OF THE INVENTION

To meet this and other needs, and in view of its purposes, the present invention provides a program implemented on a processor for executing the following steps: (a) receiving images of a scene comprising successive frames from a camera, each frame including an array of pixels; (b) filtering intensities of the array of pixels in a respective frame by using a Bessel Filter to compute a constant value for the respective frame, and (c) summing a predetermined number of respective frames from the camera to determine rapid motion in the scene.

The filtering step includes using a Bessel filter, which is an n-pole recursive digital filter, where n is a positive integer. The Bessel filter is an 8-pole recursive digital filter.

Each frame is defined by a 2-dimensional tensor of $I_{i,j}(t)$, where i and j are a row and column, respectively, in the array of pixels, and I are the intensities in the array of pixels at time t.

The scene is captured by a closed circuit television (CCTV) camera, and the rapid motion in the scene is a weather-related occurrence. The weather-related occurrence includes motion of a rain fall, a hail storm, a snow storm, or a tornado.

The Bessel filter is defined by a ratio between (a) an (n−1) order polynomial of a complex number and (b) an n order polynomial of a complex number, where n is a positive number.

The filtering is implemented using the following recursive relationship:

$$I'_{i,j,k} = \Gamma_0 I_{i,j,k} - \Gamma_1 I_{i,j,k-1} + \Gamma_2 I_{i,j,k-2} - \Gamma_3 I_{i,j,k-3} + \Gamma_4 I_{i,j,k-4} - \Gamma_5 I_{i,j,k-5} + \Gamma_6 I_{i,j,k-6} - \Gamma_7 I_{i,j,k-7} + \Gamma_8 I'_{i,j,k-1} - \Gamma_9 I'_{i,j,k-2} + \Gamma_{10} I'_{i,j,k-3} - \Gamma_{11} I'_{i,j,k-4} + \Gamma_{12} I'_{i,j,k-5} - \Gamma_{13} I'_{i,j,k-6} + \Gamma_{14} I'_{i,j,k-7} - \Gamma_{15} I'_{i,j,k-8}$$

where:
$I_{i,j,k}$ are pixel intensities of a $k^{th}$ frame captured by the camera,
$I'_{i,j,k}$ are filtered pixel intensities of the $k^{th}$ frame,
the $k^{th}$ frame is defined as a present frame,
(k-1) to (k-8) are successive previous frames, and
$\Gamma_0$-$\Gamma_{15}$ are constants.

The program may include the following step: (d) masking a first portion of the scene; and the step of filtering includes filtering intensities of the array of pixels in a second portion of the scene. The masking of the first portion of the scene is effective in removing motion of a non-weather-related occurrence in the scene.

Summing the predetermined number of respective frames includes summing eight successive frames from the camera.

Another embodiment of the present invention is a system for extracting weather-related events from a camera. The system includes a closed circuit television (CCTV) camera for monitoring a scene, and a filter for low pass filtering successive frames of the scene captured by the CCTV camera. The filter includes a Bessel function for computing constant values for the successive frames of the scene, and assigning a computed constant value to each of the successive frames, wherein a respective computed constant value multiplied by the intensities of a respective frame is defined as a filtered frame of the scene. A summer is included for summing a predetermined number of filtered frames of the scene, wherein the summer is effective in determining rapid motion in the scene. The filter includes a Bessel filter, which is an n-pole recursive digital filter, where n is a positive integer. The Bessel filter is defined by a ratio between (a) an (n−1) order polynomial of a complex number and (b) an n order polynomial of a complex number, where n is a positive number.

Yet another embodiment of the present invention is a method of extracting weather-related events from a camera. The method includes:

receiving successive frames captured by a closed circuit television (CCTV) camera of a scene, filtering the successive frames of the scene captured by the CCTV camera by using a Bessel function for computing constant values for the successive frames of the scene, assigning a computed constant value to each of the successive frames, multiplying a respective computed constant value by intensities of the respective frame, wherein a result of the multiplying is defined as a filtered frame, summing a predetermined number of filtered frames of the scene, and determining rapid motion from the filtered frames of the scene.

The rapid motion in the scene is a weather-related event, including motion of a rain fall, a hail storm, a snow storm, or a tornado.

It is understood that the foregoing general description and the following detailed description are exemplary, but are not restrictive, of the invention.

BRIEF DESCRIPTION OF THE FIGURES

The invention may be understood from the following detailed description when read in connection with the accompanying figures.

DETAILED DESCRIPTION OF THE INVENTION

As will be explained, the present invention receives images from multiple cameras, such as closed circuit television (CCTV) cameras, and uses a recursive filter with an infinite frequency response to run in real-time on each CCTV image pixel in a frame. The recursive filter is executed in the time domain, rather than in the spatial domain. The recursive filter is effectively a low pass filter for identifying, in real-time, rapid changes in a scene being viewed by a CCTV camera.

The present invention examines scenes obtained from the cameras where typically no rapid changes are expected to occur. For example, the scenes may be that of a portion of the sky, a road intersection, or an underpass below a bridge. Since the filter operates very fast, the filter may raise a flag or an alert when a change occurs in an unexpected area. Once the flag or the alert is raised, a human observer, or a more complex computer analysis may be used to diagnose the type of event that is occurring, such as rain fall, hail storm, snow storm, tornado, or even forest fire.

Figure 1:
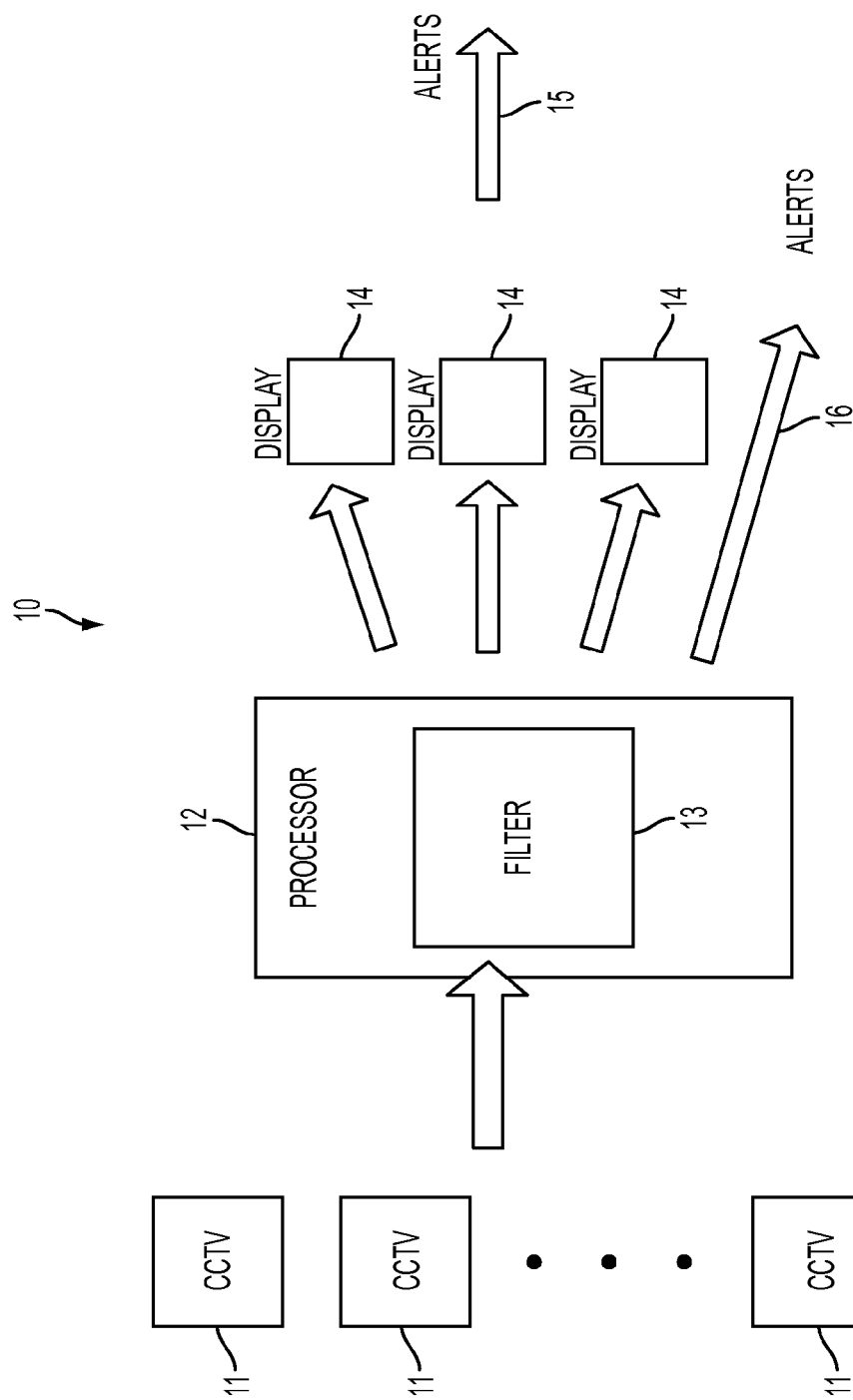
FIG. 1 is a system for extracting extreme weather events from CCTV video, in accordance with an embodiment of the present invention.

Referring now to FIG. 1, there is shown a system for extracting extreme weather events from CCTV video, generally designated as 10. As shown, system 10 includes multiple CCTV cameras 11, a processor 12 and multiple displays 14. The processor 12 includes a recursive filter 13, which provides one embodiment of the present invention. The displays 14 may be monitored by a user (not shown) and may provide a flag, or an alert 15 that points to a location of a specific CCTV camera 11, in which the weather event is being televised. Alternatively, processor 12 may perform an analysis and provide a flag or an alert 16 of a location of a specific CCTV camera 11 in which the weather event is being televised. The event may be that of an occurrence of rain, hail, snow, or tornado.

It will be appreciated that although multiple CCTV cameras are shown in FIG. 1, only one CCTV camera is required for the invention. Typically, an available CCTV camera viewing vehicular traffic flow may be utilized by the present invention.

Moreover, although one processor including a single filter 13 are shown in FIG. 1, it will be understood that multiple processors including one or more filters 13 may be used by the present invention. Thus, filter 13 may be multiplexed amongst each of the multiple CCTV cameras 11, or one filter may be dedicated to each respective CCTV camera 11. Any other combination of filters 13 and CCTV cameras 11 may also be used by the present invention.

Figure 2:
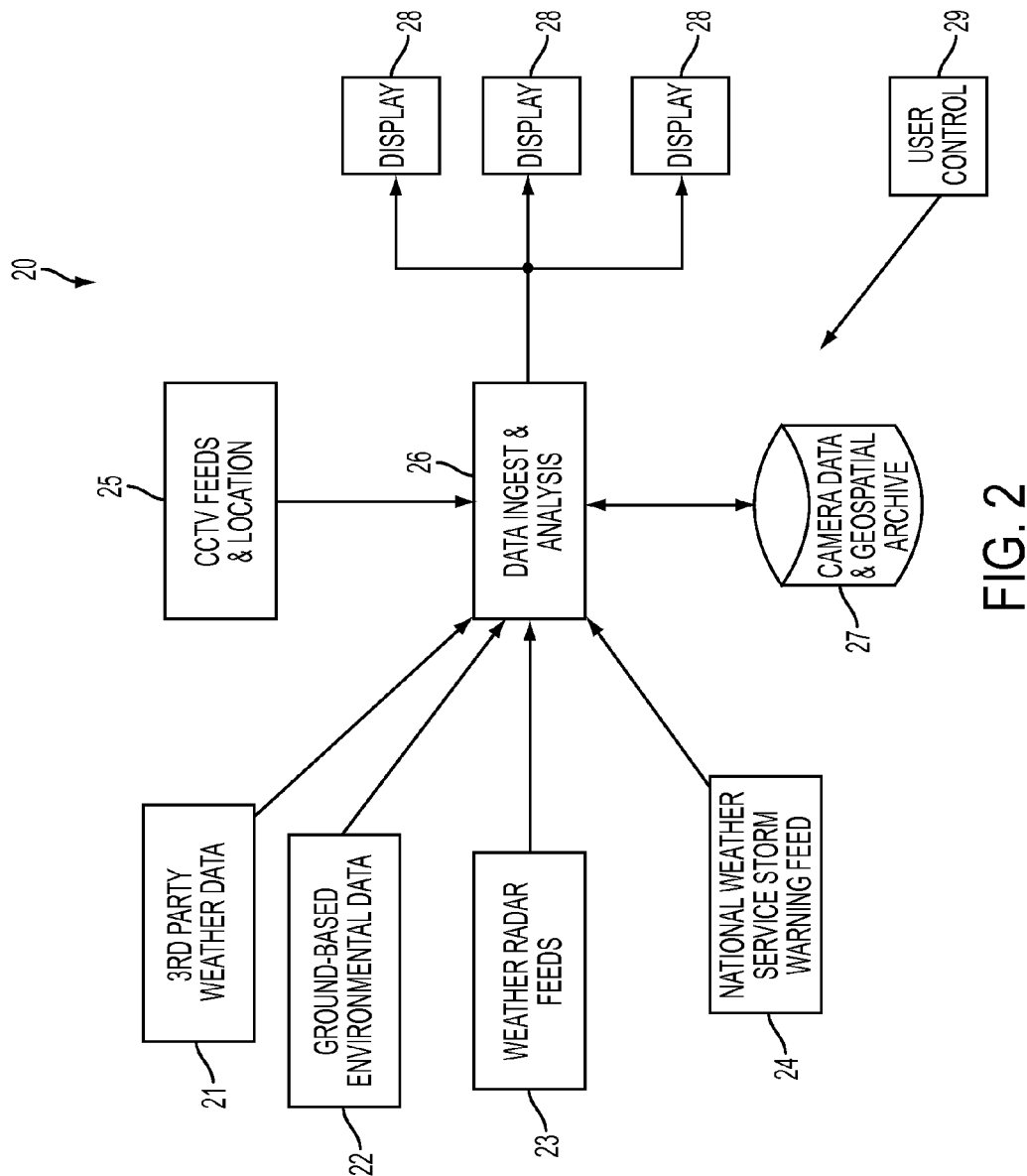
FIG. 2 is a persistent surveillance system for tracking and analysis of weather events using private/public CCTV ground based cameras, in accordance with an embodiment of the present invention.

In another embodiment of the present invention, FIG. 2 shows a coordinated ground-based persistent surveillance system for tracking and analysis of weather events using private/public CCTV ground-based cameras. The system which is designated as 20, provides collection, storage exploitation and visual weather detection and verification.

While satellite/aerial imaging depicts weather events from an atmospheric perspective, system 20 takes advantage of ground-level observations using existing terrestrial camera networks. Severe weather warning reports and other related weather event data (radar) may be used to geographically track local weather events and point camera network assets on a weather event from multiple vantage points for observation.

As shown, system 20 receives data from multiple sources, including third party weather data 21, ground-based environmental data 22, weather radar feeds 23, National Weather Service storm warning feeds 24, and CCTV feeds 25 from known locations. All inputted data are ingested and analyzed by module 26, with the aid of camera data and geospatial archive 27. A mapping and display interface 28 is available to visualize the weather events and enable a user or multiple users to control and enter data, by way of a mouse or keyboard (for example), generally shown as user control module 29.

The recursive digital filter 13, shown in FIG. 1, will now be described in greater detail. A CCTV video includes a series of frames, eight of which are shown in FIG. 3 as original frames arriving from a CCTV camera. As an example, consider that a black and white CCTV video may be represented as a 2D tensor $I_{i,j}(t)$. The video then varies in time for each of its horizontal and vertical pixels i and j, respectively, over the various frames, occurring at time t. Assuming that $t=t_k=k\Delta t$ (i.e. for frame k), then k may be considered as the present frame and (k-1), (k-2), . . . (k-8) may be considered eight previous frames.

When designing filters, it is convenient to transfer $I_{i,j}(t)$ to the Laplace domain to become $I_{i,j}(s)$, where s is a complex frequency variable. A Bessel filter F(s) may be designed within the Laplace domain to low pass filter a signal $I_{i,j}(s)$ using only multiplication as in Equation 1. The filter itself may be found from the reciprocal of a Bessel polynomial of order 'n'. An 8th order filter is shown in Equations 2 and 3.

$$I_{i,j}'(s) = F(s) \times I_{i,j}(s) \quad (1)$$

$$F(s) = 2027025 \times \left[ \sum_{p=0}^{8} \frac{(8+p)!}{(8-p)!p!} \times \left(\frac{s}{2}\right)^p \right]^{-1} \quad (2)$$

$$F(s) = \frac{2027025}{2027025s^8 + 2027025s^7 + 9459455s^6 + 2702705s^5 + 519755s^4 + 6930s^3 + 630s^2 + 36s + 1} \quad (3)$$

Since the Bessel polynomial has 8 complex roots of $v_1 \rightarrow v_8$, the filter may be written as the product of eight fractions, as shown in Equation 4. These are then converted into the partial fractions shown in Equation 5, which has the form that may be inverse Laplace transformed directly back to the time domain, as shown in Equation 6 (where $\bar{\omega}$ is the Bessel filter cut-off frequency in rad/s).

$$F(s) = \prod_{p=1}^{8} \frac{1}{s - v_p} \quad (4)$$

$$F(s) = \sum_{p=1}^{8} \frac{\varrho_p}{s - v_p} \quad (5)$$

$$F(t) = \sum_{p=1}^{8} \varrho_p e^{v_p \bar{\omega} t} \quad (6)$$

Equation 7 is a rewrite of Equation 6 in the digital time domain for video frame k (where typically $\Delta t = \frac{1}{5}$ seconds). To create the recursive form of a filter with this time response, it is necessary to take the Uni-lateral Z transform, as shown in Equation 8 (where z is a general complex number).

$$F_k = \sum_{p=1}^{8} \varrho_p e^{v_p \bar{\omega} k \Delta t} \quad (7)$$

$$F(z) = \sum_{k=0}^{\infty} F_k \times z^{-k} \quad (8)$$

Since the Z transform is simply 8 infinite geometric summations with common factors $e^{v_p \bar{\omega} \Delta t} z^{-1}$ (all <1), the Z domain impulse response of the Bessel filter may be written as Equation 9.

$$F(z) = \sum_{p=1}^{8} \frac{\varrho_p}{1 - e^{v_p \bar{\omega} \Delta t} z^{-1}} \quad (9)$$

Similar to the Laplace domain, the filtered result S(z) in the Z domain may be found from the product of the signal S(z) and the filter impulse response F(z). This is shown in Equation 10. Expansion of the representation of F(z) in Equation 9 shows it to be a ratio between a $7^{th}$ and an $8^{th}$ order polynomial of z (as shown in Equation 11).

$$I_{i,j}'(z) = F(z) \times I_{i,j}(z) \quad (10)$$

$$= \begin{pmatrix} \Gamma_0 - \Gamma_1 z^{-1} + \Gamma_2 z^{-2} - \Gamma_3 z^{-3} + \\ \Gamma_4 z^{-4} - \Gamma_5 z^{-5} + \Gamma_6 z^{-6} - \Gamma_7 z^{-7} \\ \Gamma_8 z^{-1} - \Gamma_9 z^{-2} + \Gamma_{10} z^{-3} - \Gamma_{11} z^{-4} + \\ \Gamma_{12} z^{-5} - \Gamma_{13} z^{-6} + \Gamma_{14} z^{-7} - ma_{15} z^{-8} \end{pmatrix} \times I_{i,j}(z) \quad (11)$$

Advantage is then taken of the property of the Z transform shown in Equation 12. Re-arranging Equation 11 before performing an inverse Z transform to return to the digital time domain, where $t=t_k=k\Delta t$ (i.e. for frame k), provides the recursive relationship of Equation 13.

$$F(z) \times z^{-P} = \sum_{k=0}^{\infty} F_{k-p} \times z^{-k} \quad (12)$$

$$I_{i,j,k}' = \quad (13)$$
$$\Gamma_0 I_{i,j,k} - \Gamma_1 I_{i,j,k-1} + \Gamma_2 I_{i,j,k-2} - \Gamma_3 I_{i,j,k-3} + \Gamma_4 I_{i,j,k-4} - \Gamma_5 I_{i,j,k-5} +$$
$$\Gamma_6 I_{i,j,k-6} - \Gamma_7 I_{i,j,k-7} + \Gamma_8 I_{i,j,k-1}' - \Gamma_9 I_{i,j,k-2}' + \Gamma_{10} I_{i,j,k-3}' -$$
$$\Gamma_{11} I_{i,j,k-4}' + \Gamma_{12} I_{i,j,k-5}' - \Gamma_{13} I_{i,j,k-6}' + \Gamma_{14} I_{i,j,k-7}' - \Gamma_{15} I_{i,j,k-8}'$$

Figure 3A:
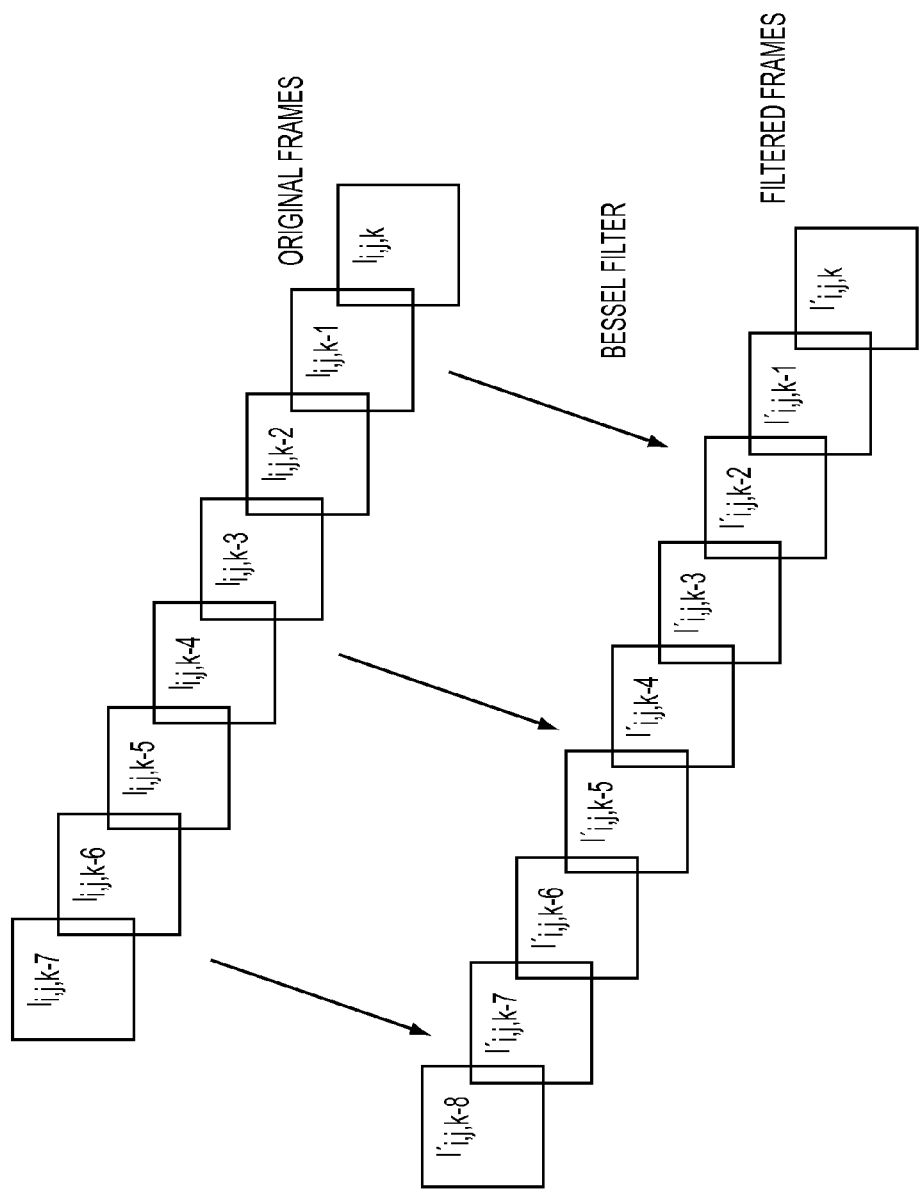
FIG. 3A is a pictorial of successive original frames passing through a recursive Bessel filter to produce successive filtered frames, in accordance with an embodiment of the present invention.

From Equation 13, it will now be apparent that the filtering process includes a summation of successive frames from the incoming original video from any CCTV camera. In addition, each new filtered frame includes a summation of eight successive original frames and eight successive filtered frames. The constants, $\Gamma_0$-$\Gamma_{15}$, are computed using recursive computations of the Bessel Filter, shown above. This iterative process is depicted in FIG. 3A.

Figure 4:
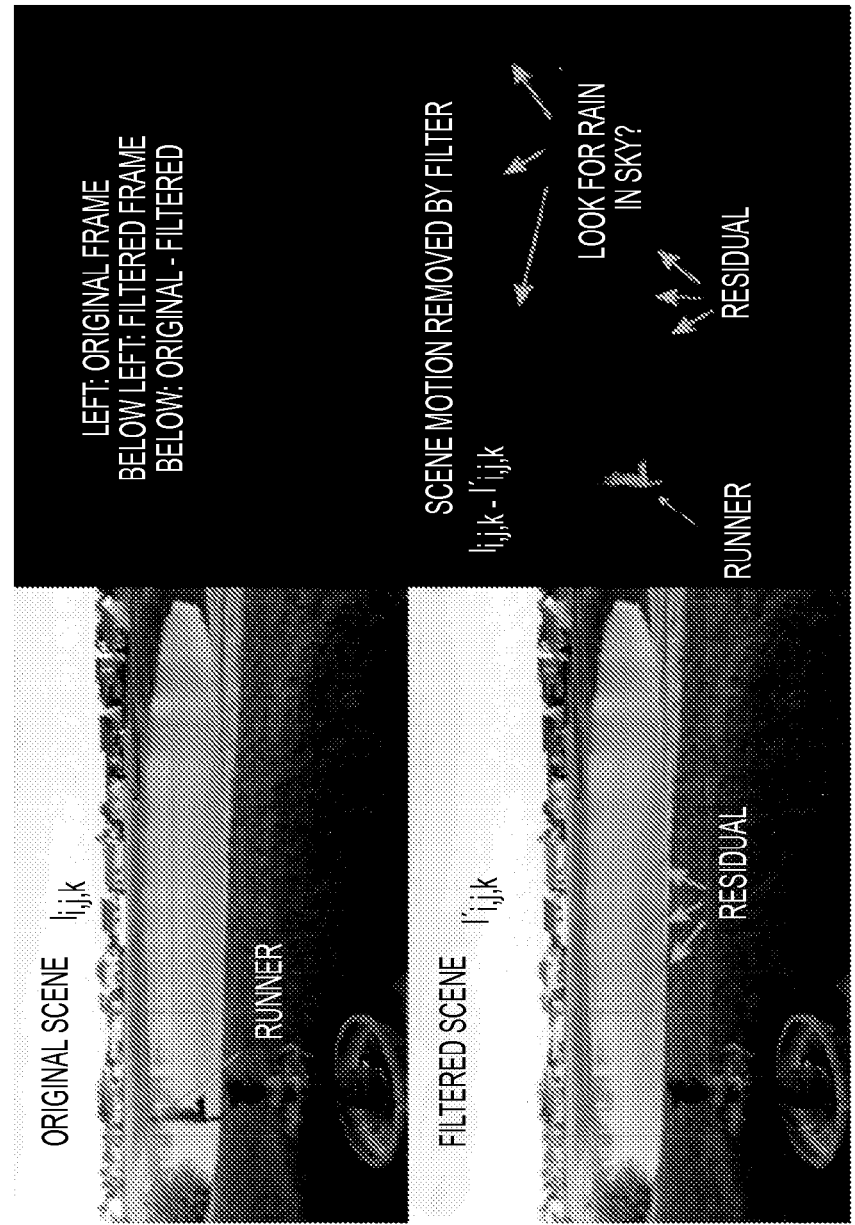
FIG. 4 is a pictorial of an original scene and a filtered scene, showing removal of a runner from the original scene, in accordance with an embodiment of the present invention.

An example of the effectiveness of this filter is shown in FIG. 4. The original frame $I_{i,j,k}$ is at the top left where a runner has been captured in motion by a stationary CCTV camera. The corresponding result $I'_{i,j,k}$ from Equation 13 is shown at the bottom left. As shown, the result has virtually removed the moving runner (with some residual features, however, around the leg region). The difference between the original and filtered frames is shown at the bottom right to have successfully identified an image of the runner in motion.

Due to its speed and simplicity, this recursive filter may be applied in real-time to all CCTV camera videos available to a weather detection and identification system.

Figure 3B:
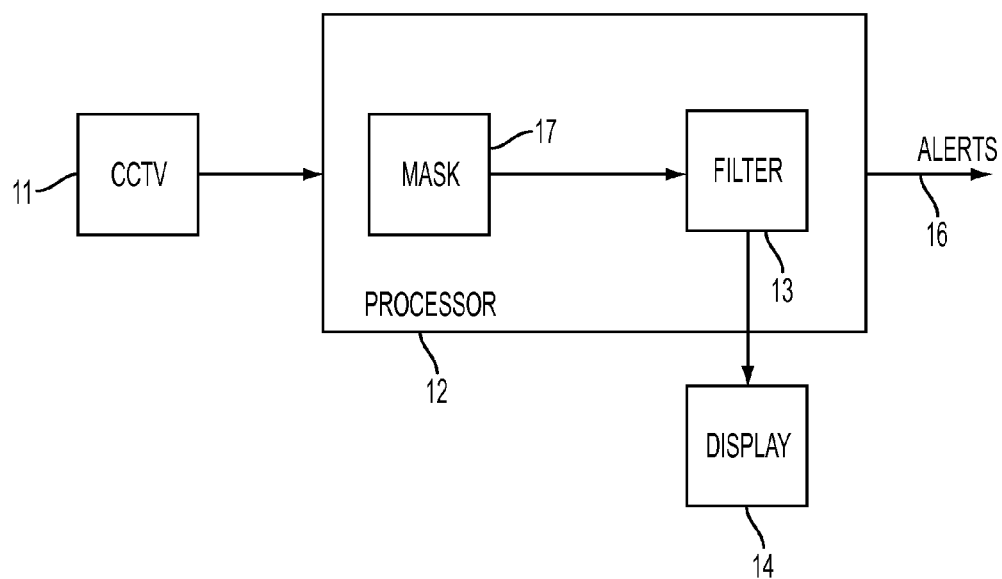
FIG. 3B is a block diagram of a system of the present invention including a masking module for masking portions of video frames incoming from the CCTV camera(s) and filtering only the masked portions of the video frames, in accordance with an embodiment of the present invention.

Suitable masks for each CCTV frame may be used so that traffic motion may be ignored, while motion in the sky, or under an overpass may alert a computer or observer to a potential extreme weather event. In this manner, more observational/computational resources may be applied to further diagnose the event. A masking module is shown included, as an option, in processor 12, which is depicted in FIG. 3B. The masking module is designated as 17.

Figure 5:
FIG. 5 is a pictorial of an original scene and a filtered scene, showing the identification of snow, in accordance with an embodiment of the present invention.
Figure 6:
FIG. 6 is a pictorial of an original scene and a filtered scene, showing the identification of a tornado, in accordance with an embodiment of the present invention.

Two additional examples of the effectiveness of the filter are shown in FIGS. 5 and 6 for a snow storm and tornado, respectively. If a mask is designed to look for motion in an underpass region of a snowstorm (FIG. 5) or in the sky to look for a tornado (FIG. 6), then a user or more powerful computer may be alerted that an unusual event is occurring in the region of the camera.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A processor for executing the following steps:
   receiving images of a scene comprising successive frames from a camera, each frame including an array of pixels;
   filtering intensities of the array of pixels in a respective frame by using a Bessel Filter to compute a constant value for the respective frame, and
   summing a predetermined number of respective frames from the camera to determine rapid motion in the scene,
   wherein the rapid motion in the scene is a weather-related event, including motion of a rain fall, a hail storm, a snow storm, or a tornado, which is provided as notification to a remote station, and
   the filtering is implemented using the following recursive relationship:

$$I'_{i,j,k} = \Gamma_0 I_{i,j,k} - \Gamma_1 I_{i,j,k-1} + \Gamma_2 I_{i,j,k-2} - \Gamma_3 I_{i,j,k-3} + \Gamma_4 I_{i,j,k-4} - \Gamma_5 I_{i,j,k-5} +$$
$$\Gamma_6 I_{i,j,k-6} - \Gamma_7 I_{i,j,k-7} + \Gamma_8 I'_{i,j,k-1} - \Gamma_9 I'_{i,j,k-2} + \Gamma_{10} I'_{i,j,k-3} -$$
$$\Gamma_{11} I'_{i,j,k-4} + \Gamma_{12} I'_{i,j,k-5} - \Gamma_{13} I'_{i,j,k-6} + \Gamma_{14} I'_{i,j,k-7} - \Gamma_{15} I'_{i,j,k-8}$$

where:
   $I_{i,j,k}$ are pixel intensities of a $k^{th}$ frame captured by the camera,
   $I'_{i,j,k}$ are filtered pixel intensities of the $k^{th}$ frame,
   the $k^{th}$ frame is defined as a present frame,
   (k-1) to (k-8) are successive previous frames, and
   $\Gamma_0$-$\Gamma_{15}$ are constants.

2. The processor of claim 1 wherein
   filtering includes using a Bessel filter, which is an n-pole recursive digital filter, where n is a positive integer.

3. The processor of claim 2 wherein
   the Bessel filter is an 8-pole recursive digital filter.

4. The processor of claim 1 wherein
   each frame is defined by a 2-dimensional tensor of $I_{i,j}(t)$, where i and j are a row and column, respectively, in the array of pixels, and
   I are the intensities in the array of pixels at time t.

5. The processor of claim 1 wherein
   the scene is captured by a closed circuit television (CCTV) camera, and
   the rapid motion is a weather-related occurrence.

6. The processor of claim 5 wherein
   the weather-related occurrence includes motion of a rain fall, a hail storm, a snow storm, or a tornado.

7. The processor of claim 2 wherein
   the Bessel filter is defined by a ratio between (a) an (n-1) order polynomial of a complex number and (b) an n order polynomial of a complex number,
   where n is a positive number.

8. The program processor of claim 1 including the following step:
   masking a first portion of the scene; and
   wherein the step of filtering includes filtering intensities of the array of pixels in a second portion of the scene.

9. The processor of claim 8 wherein
   the masking of the first portion of the scene is effective in removing motion of a non-weather-related occurrence in the scene.

10. The processor of claim 1 wherein
    summing the predetermined number of respective frames includes summing eight successive frames from the camera.

11. A system for extracting weather-related events from a camera comprising:
    a closed circuit television (CCTV) camera for monitoring a scene,
    a filter for low pass filtering successive frames of the scene captured by the CCTV camera,
    the filter including a Bessel function for computing constant values for the successive frames of the scene, and assigning a computed constant value to each of the successive frames, wherein a respective computed constant value multiplied by the intensities of a respective frame is defined as a filtered frame of the scene, and
    a summer for summing a predetermined number of filtered frames of the scene,
    wherein the summer is effective in determining rapid motion in the scene.

12. The system of claim 11 wherein
    the filter includes a Bessel filter, which is an n-pole recursive digital filter, where n is a positive integer.

13. The system of claim 11 wherein
    the rapid motion in the scene is a weather-related event, including motion of a rain fall, a hail storm, a snow storm, or a tornado.

14. The system of claim 12 wherein
    the Bessel filter is defined by a ratio between (a) an (n-1) order polynomial of a complex number and (b) an n order polynomial of a complex number,
    where n is a positive number.

15. The system of claim 11 including:
    a mask for masking a first portion of the scene captured by the CCTV camera, and
    wherein the filter is configured to filter intensities of a second portion of the scene, in which the second portion is unmasked.

16. A method of extracting weather-related events from a camera comprising:
    receiving successive frames captured by a closed circuit television (CCTV) camera of a scene,
    filtering the successive frames of the scene captured by the CCTV camera by using a Bessel function for computing constant values for the successive frames of the scene,
    assigning a computed constant value to each of the successive frames,
    multiplying a respective computed constant value by intensities of the respective frame, wherein a result of the multiplying is defined as a filtered frame,
    summing a predetermined number of filtered frames of the scene, and determining rapid motion from the filtered frames of the scene.

17. The method of claim 16 wherein
the rapid motion in the scene is a weather-related event, including motion of a rain fall, a hail storm, a snow storm, or a tornado.

18. The method of claim 16 wherein
filtering includes a Bessel filter, which is defined by a ratio between (a) an (n−1) order polynomial of a complex number and (b) an n order polynomial of a complex number,
where n is a positive number.

19. The method of claim 16 including the steps of:
masking a first portion of the scene captured by the CCTV camera, and
wherein filtering the successive frames of the scene includes filtering intensities of a second portion of the scene, in which the second portion is unmasked.

* * * * *